Dec. 31, 1929.  A. E. GREENE  1,741,839
VENTING ELECTRIC SWITCH
Filed Feb. 18, 1927
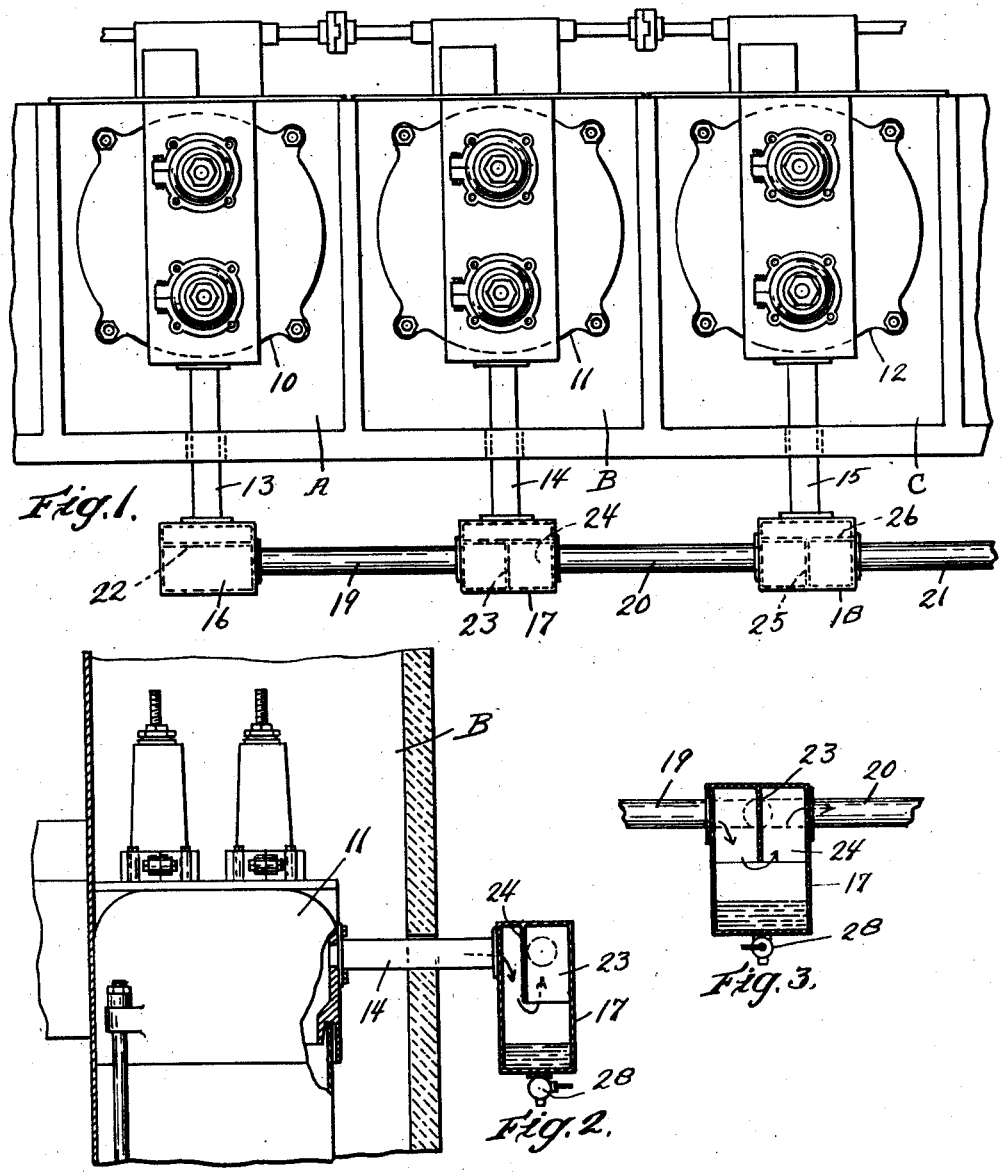

Patented Dec. 31, 1929

1,741,839

UNITED STATES PATENT OFFICE

AUSTIN EDWIN GREENE, OF MEDFORD, MASSACHUSETTS, ASSIGNOR TO CONDIT ELECTRICAL MANUFACTURING CORPORATION, OF SOUTH BOSTON, MASSACHUSETTS, A CORPORATION OF MASSACHUSETTS

VENTING ELECTRIC SWITCH

Application filed February 18, 1927. Serial No. 169,356.

The present invention relates to electric switches of the oil type.

It is well known that under certain operating conditions of the switch gases and vapors may form in the oil receptacle and generate pressure which causes oil to be ejected. To relieve the pressure in the oil receptacle there is usually provided a vent pipe. When a plurality of switches are employed, as for the control of a multi-phase circuit, the vent pipes are connected to a common header or manifold pipe which conveys the gases and vapors and some oil from the switch receptacles to any desired point.

The common header or manifold, as heretofore used, is objectionable more particularly because abnormal conditions of one switch may be transmitted to one or more of the other switches through the common header. For instance, an explosion in one switch receptacle may be communicated to the other switch receptacles and may result in serious injury to all of the switches.

According to the present invention, the objectionable features of a common header for the vent pipes of a plurality of switches are obviated.

Fig. 1 is a plan view of a plurality of switches connected to a common header and embodying the invention;

Fig. 2 is a side view of one of the switches showing a separator in section;

Fig. 3 is a sectional view of a separator between adjacent header sections.

The invention is herein shown applied to three switches 10, 11 and 12 adapted for the control of a three phase circuit. Each switch is contained in one of three cells A, B and C which are arranged side by side. Vent pipes 13, 14 and 15 are connected to the oil receptacles of the switches above the level of the oil therein and extend through the cell walls to a common header.

According to this invention, the vent pipes 13, 14 and 15 are connected to oil separators 16, 17 and 18 which may form a common header together with the connecting pipes or header sections 19 and 20 and a take-off pipe or header section 21, the latter being extended to any desired point.

The end separator 16 has a single baffle 22 for the fluids passing through the vent pipe 13 from the switch casing 10. The separators 17 and 18 are connected to vent pipes 14 and 15 and to adjacent header sections 19, 20 and 21. The separators 17 and 18 are identical in construction and include baffles 23 and 25 for the fluids issuing from the header sections 19 and 20, and baffles 24 and 26 for the fluids issuing from the vent pipes 14 and 15. Each of the separators may have a drain cock 27.

It will be noted that the separators including the baffles therein prevent free communication between the oil receptacles through the common header.

The construction and arrangement of parts may be modified without departing from the invention.

I claim:

1. The combination with a plurality of switches having oil receptacles and vent pipes connected thereto, of a common header to which said vent pipes are connected, and means for preventing the transmission of an abnormal condition in one oil receptacle to another of said oil receptacles through said header while maintaining said header and vent pipes free to carry off the gases discharged from said receptacles.

2. The combination with a plurality of switches having oil receptacles and vent pipes connected thereto, of a common header, and an oil separator between and common to each vent pipe and said header having means for cooling the vented gas and for entrapping a body of oil above which the vented gas can pass freely into said header.

3. The combination with a plurality of switches having oil receptacles and vent pipes connected thereto, of a common header, and separators between each vent pipe and said header and between adjacent header sections.

4. The combination with a plurality of switches having oil receptacles and vent pipes connected thereto, of a common header, separators between adjacent header sections connected to said vent pipes and to said header sections, said separators having baffles opposing the flow of fluids from the vent pipes and baffles opposing the flow of fluids from adjacent header sections and means disposed beneath said baffles to collect a body of liquid over which body the gases can pass freely.

5. The combination of a plurality of electric switches having oil-containing casings and vent pipes connected to said casings above the oil therein, a venting conduit common to all of said switches including conduit sections connecting the vent pipes of the several switches, and fluid separating means disposed at the intersections of said conduit sections and said vent pipes including angularly related baffles arranged to prevent the unrestricted flow of fluid from said vent pipes into said conduit and also between adjacent conduit sections and to collect a body of fluid over which the escaping gases can pass freely prior to entering said conduit sections.

6. The combination of a plurality of electric switches having casings adapted to contain oil and vent pipes connected to said casings above the level of the oil therein, a venting conduit common to all of said switches including conduit sections disposed between the vent pipes of the several switches, and means disposed at the junctions of said vent pipes and conduit sections providing restricted fluid communication between said vent pipes and conduit and also between adjacent conduit sections, said means including an expansion chamber having a baffle member disposed therein and spaced from and extended a substantial distance below the open end of said vent pipe and a second angularly related baffle disposed between and spaced from the open ends of the adjacent conduit sections and extended a substantial distance therebelow, and a spill receptacle disposed beneath said baffles.

In testimony whereof, I have signed my name to this specification.

AUSTIN EDWIN GREENE.